(12) United States Patent
Yu et al.

(10) Patent No.: US 12,449,199 B2
(45) Date of Patent: Oct. 21, 2025

(54) DEVICE AND METHOD FOR SAFE ALUMINIUM RESIDUE STORAGE

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP VEHICLES RECYCLING CO., LTD., Changsha (CN)

(72) Inventors: Haijun Yu, Foshan (CN); Yingsheng Zhong, Foshan (CN); Yinghao Xie, Foshan (CN); Changdong Li, Foshan (CN); Xuemei Zhang, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP VEHICLES RECYCLING CO., LTD., Changsha (CN)

( * ) Notice: Subject to any disclaimer, the term of this patent is extended or adjusted under 35 U.S.C. 154(b) by 245 days.

(21) Appl. No.: 18/556,608

(22) PCT Filed: Dec. 29, 2021

(86) PCT No.: PCT/CN2021/142570
§ 371 (c)(1),
(2) Date: Oct. 20, 2023

(87) PCT Pub. No.: WO2022/222539
PCT Pub. Date: Oct. 27, 2022

(65) Prior Publication Data
US 2024/0219117 A1    Jul. 4, 2024

(30) Foreign Application Priority Data
Apr. 22, 2021 (CN) .......................... 202110436489.7

(51) Int. Cl.
*F26B 9/06* (2006.01)
*B65G 33/08* (2006.01)
(Continued)

(52) U.S. Cl.
CPC .............. *F26B 9/066* (2013.01); *B65G 33/08* (2013.01); *F26B 17/12* (2013.01); *F26B 21/004* (2013.01);
(Continued)

(58) Field of Classification Search
CPC ........ F26B 9/066; F26B 17/12; F26B 21/004; F26B 21/14; F26B 25/002; B65G 33/08; H05F 3/02
See application file for complete search history.

(56) References Cited

U.S. PATENT DOCUMENTS 2,720,710 A * 10/1955 Erisman .................... F26B 3/00
34/79
3,400,465 A * 9/1968 Von Stroh ............... F26B 17/04
34/443
(Continued)

FOREIGN PATENT DOCUMENTS

CN          205771102 U  * 12/2016
CN          207006891 U    2/2018
(Continued)

OTHER PUBLICATIONS

Office Action in patent application GB2316001.3 mailed Sep. 18, 2024.
(Continued)

Primary Examiner — Edelmira Bosques
Assistant Examiner — Bao D Nguyen
(74) Attorney, Agent, or Firm — Westbridge IP LLC

(57) ABSTRACT

Disclosed is a device and method for safe aluminum residue storage, including: a drying bin, where a side wall of the
(Continued)

drying bin is provided with a first air inlet pipe and a first air outlet pipe, the first air inlet pipe is connected to a first drying blower, and the first air outlet pipe is connected sequentially to a deacidifier, a dehydrogenator, and a first exhaust fan along an airflow direction thereof; and a storage bin, where a feed inlet of the storage bin is connected to a discharge outlet of the drying bin through a screw conveyor, a side wall of the storage bin is provided with a second air inlet pipe and a second air outlet pipe, the second air inlet pipe is connected to a second drying blower, and an end of the second air inlet pipe can be connected to an inert gas bottle.

20 Claims, 1 Drawing Sheet

(51) Int. Cl.
*F26B 17/12* (2006.01)
*F26B 21/00* (2006.01)
*F26B 21/14* (2006.01)
*F26B 25/00* (2006.01)
*H05F 3/02* (2006.01)

(52) U.S. Cl.
CPC ............ *F26B 21/14* (2013.01); *F26B 25/002* (2013.01); *H05F 3/02* (2013.01)

(56) References Cited

U.S. PATENT DOCUMENTS

| | | | | | |
|---|---|---|---|---|---|
| 3,601,900 | A | * | 8/1971 | Erisman | F26B 3/00 34/79 |
| 3,767,179 | A | * | 10/1973 | Larson | G05D 23/1919 266/88 |
| 3,801,264 | A | * | 4/1974 | Lindl | F26B 21/04 34/131 |
| 3,839,086 | A | * | 10/1974 | Larson | F26B 23/022 34/116 |
| 4,710,126 | A | * | 12/1987 | Areaux | F26B 17/10 34/576 |
| 4,721,457 | A | * | 1/1988 | Areaux | F26B 17/10 34/591 |
| 4,784,603 | A | * | 11/1988 | Robak, Jr. | F27D 17/10 110/282 |
| 2007/0224109 | A1 | * | 9/2007 | Chaifetz | C01G 49/10 422/198 |
| 2008/0006034 | A1 | * | 1/2008 | Cerroni | B09B 3/35 95/55 |
| 2010/0096336 | A1 | * | 4/2010 | O'Reilly | C10L 5/46 210/710 |
| 2016/0128376 | A1 | * | 5/2016 | Casper | F26B 21/004 34/227 |
| 2022/0064535 | A1 | * | 3/2022 | Strekal | F26B 17/04 |

FOREIGN PATENT DOCUMENTS

| | | | | | |
|---|---|---|---|---|---|
| CN | 108020046 | A | * | 5/2018 | ............ F26B 25/16 |
| CN | 207556113 | U | | 6/2018 | |
| CN | 109163517 | A | * | 1/2019 | ............ A23B 9/08 |
| CN | 210512570 | U | * | 5/2020 | |
| CN | 212157911 | U | | 12/2020 | |
| CN | 212806229 | U | | 3/2021 | |
| CN | 215447162 | U | | 1/2022 | |
| CN | 218089734 | U | * | 12/2022 | |
| GB | 2620087 | B | | 3/2025 | |
| JP | 2020176936 | A | * | 10/2020 | |
| JP | 7181150 | B2 | * | 11/2022 | |
| KR | 101958559 | B1 | * | 3/2019 | ............ B65G 33/10 |
| KR | 20190023599 | A | * | 3/2019 | ............ F26B 15/18 |

OTHER PUBLICATIONS

Intention to Grant received in patent application GB2316001.3 mailed Oct. 22, 2025.
Notification of Grant received in patent application GB2316001.3 mailed Feb. 25, 2025.
International Search Report and Written Opinion of the International Searching Authority issued for PCT Application No. PCT/CN2021/142570 on Mar. 23, 2022 with English translation, 12 pgs.

* cited by examiner

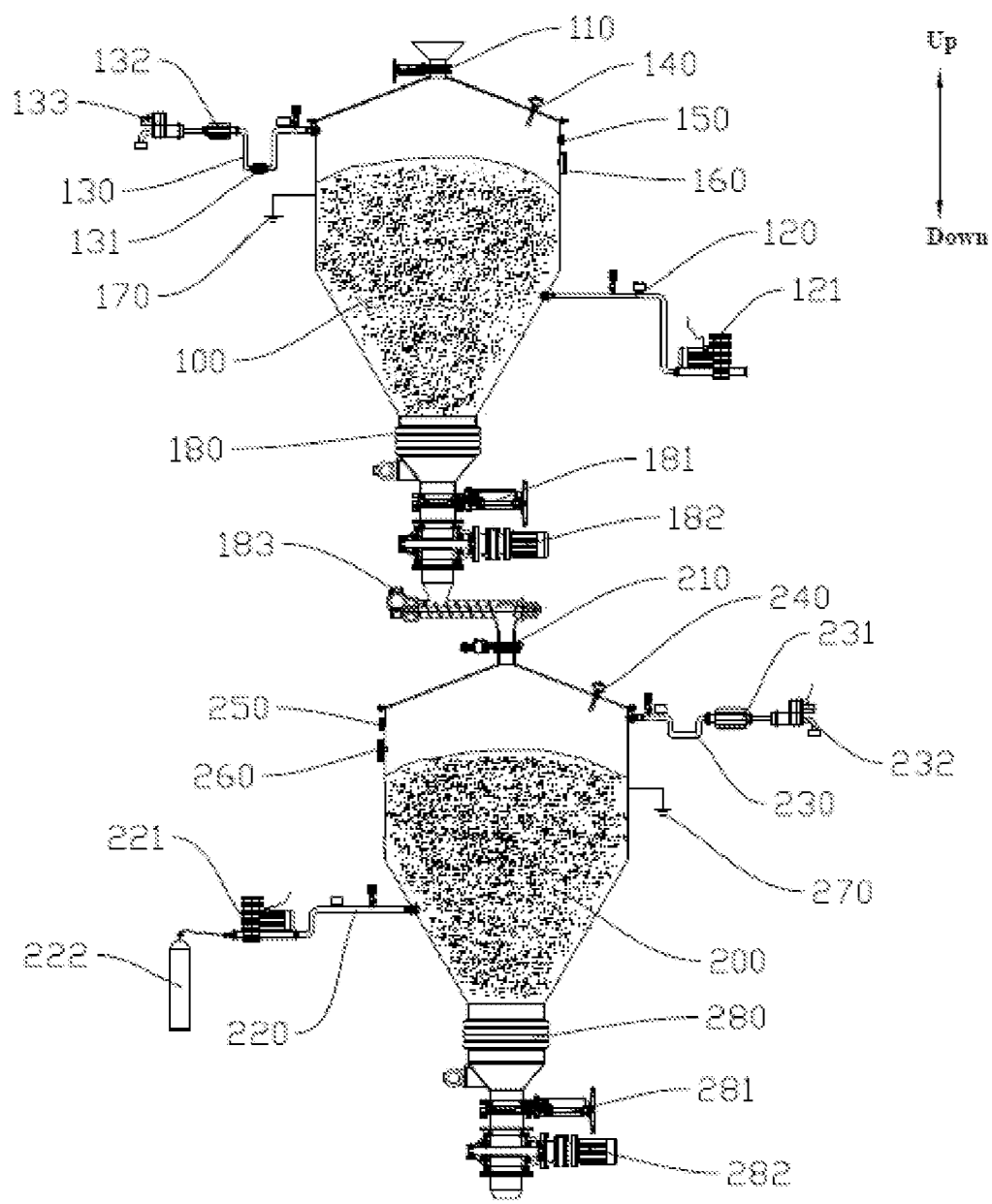

DEVICE AND METHOD FOR SAFE ALUMINIUM RESIDUE STORAGE

CROSS-REFERENCE TO RELATED APPLICATIONS

The present application is a national phase entry under 35 USC § 371 of International Application PCT/CN2021/142570, filed Dec. 29, 2021, which claims the benefit of and priority to Chinese Patent Application No. 202110436489.7, filed Apr. 22, 2021, the entire disclosures of which are incorporated herein by reference.

TECHNICAL FIELD

The present disclosure relates to the technical field of aluminum residue storage, and in particular to a device and method for safe aluminum residue storage.

BACKGROUND

Lithium batteries are widely used in electric vehicles, electronic products, power storage, and other fields. In particular, with the rapid development of the important new energy vehicle industry in China, the demand for lithium batteries is increasing. In a production process of lithium batteries, lots of battery positive electrode sheet scraps are produced. The positive electrode sheet scrap is composed of aluminum-based current collectors, $LiNi_aCo_bMn_cO_2$-based ($a+b+c=1$, and a, b, and c each are of 0 to 1) active substances, binders, conductive additives, etc., where nickel, cobalt, lithium, aluminum, manganese, etc. are metals with potential recycling value.

In a series of operations for positive electrode sheet scraps such as coarse crushing, physical sieving, and fine crushing, granular aluminum residue can be separated and recovered. The aluminum residue produced in the aluminum smelting industry usually mainly includes aluminum and metal oxides of aluminum, magnesium, calcium, silicon, etc., while the aluminum residue produced during a recycling process of positive electrode sheet scraps mainly includes aluminum and aluminum oxide and also includes binders, etc. Due to the crushing, sulfuric acid pickling, and water washing treatments in the recycling process, the aluminum residue has particles of different particle sizes, residual sulfuric acid, and high moisture content. During a storage process of aluminum residue, due to large specific surface area (SSA), fine-particle aluminum residue is easy to react with water and residual sulfuric acid to produce heat and hydrogen, thereby causing flammable and explosive accidents. The reaction of aluminum with water and acid to produce explosion has the following principle:

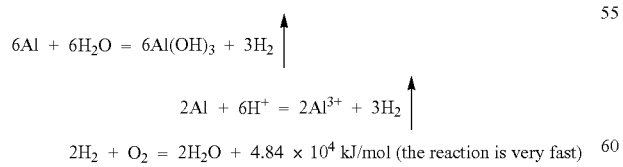

Therefore, the storage of aluminum residue produced in a recycling process of positive electrode sheet scraps needs to consider the hazards caused by the residual sulfuric acid and water of aluminum residue and the aluminum residue particle size.

SUMMARY

The present disclosure is intended to solve at least one of the technical problems existing in the prior art. In view of this, the present disclosure provides a device and method for safe aluminum residue storage, which can effectively prevent the heat release of aluminum hydrolysis and the occurrence of flammable and explosive accidents, and improve the safety of aluminum residue storage.

According to an example of a first aspect of the present disclosure, a device for safe aluminum residue storage is provided, including:

a drying bin, where a side wall of the drying bin is provided with a first air inlet pipe and a first air outlet pipe, the first air inlet pipe is connected to a first drying blower, and the first air outlet pipe is connected sequentially to a deacidifier, a dehydrogenator, and a first exhaust fan along an airflow direction thereof; and a storage bin located below the drying bin, where a feed inlet of the storage bin is connected to a discharge outlet of the drying bin through a screw conveyor, a side wall of the storage bin is provided with a second air inlet pipe and a second air outlet pipe, the second air inlet pipe is connected to a second drying blower, an end of the second air inlet pipe can be connected to an inert gas bottle, and the second air outlet pipe is connected sequentially to a dryer and a second exhaust fan along an airflow direction thereof.

The device for safe aluminum residue storage according to the example of the present disclosure at least has the following beneficial effects.

1. Compared with the traditional method of drying and storing aluminum residue in a dross tank in the open air, in the present disclosure, aluminum residue is air-dried under enclosed conditions, and the entire safe storage process is divided into a drying stage and a storage stage, such that unsafe factors in drying and storage are well controlled, separately, which reduces the impact of unsafe factors in the entire storage process. Acid gases, hydrogen, and water vapor generated are removed in the drying stage, which avoids the environmental pollution caused by acid gases and the explosion risk caused by hydrogen during the entire storage process, thereby making the entire storage process environmentally-friendly, safe, energy-saving, and pollution-free.

2. Unlike the traditional delivery of aluminum residue using a conveyor and a forklift, the present disclosure uses a screw conveyor to push dried aluminum residue into the storage bin. A speed of the screw conveyor can be reduced to avoid violent impact of aluminum residue during an aluminum residue delivery process, which makes the whole process strongly continuous, safe, and controllable.

3. The device for safe aluminum residue storage provided by the present disclosure changes the status quo of manual feeding, transfer, and discharging, and various treatment stages are compact and occupy a small space, which greatly reduces the transfer energy consumption, improves the storage efficiency, and reduces the production cost.

According to some examples of the present disclosure, the drying bin and/or the storage bin may be connected to an antistatic grounding device. The antistatic grounding device can well eliminate the influence of static electricity on an aluminum residue storage process, thereby avoiding hazards.

According to some examples of the present disclosure, a feed inlet of the drying bin may be located at a top of the drying bin, and the feed inlet of the drying bin may be provided with a first vibratory hopper. The first vibratory hopper is provided to assist the flow of aluminum residue through vibration when the aluminum residue is fed into the drying bin.

According to some examples of the present disclosure, a second vibratory hopper may be further provided between the discharge outlet of the drying bin and a feed inlet of the screw conveyor. The second vibratory hopper is provided to assist the flow of aluminum residue through vibration when the aluminum residue is discharged from the drying bin.

According to some examples of the present disclosure, a first electrostatic isolation ring may be provided between a feed inlet of the second vibratory hopper and the discharge outlet of the drying bin, and the first electrostatic isolation ring may be a rubber isolation ring containing an antistatic agent. The first electrostatic isolation ring is provided to connect the drying bin and the second vibratory hopper, such that the two are not in contact with each other. The electrostatic isolation ring can insulate/isolate the two objects to prevent static electricity transfer, which can well eliminate the influence of static electricity on an aluminum residue storage process, thereby avoiding hazards.

According to some examples of the present disclosure, a first gate valve is further provided between a discharge outlet of the second vibratory hopper and the feed inlet of the screw conveyor. The first gate valve can effectively isolate a material in the drying bin from that in the storage bin.

According to some examples of the present disclosure, a discharge outlet of the storage bin may be connected sequentially to a second electrostatic isolation ring, a third vibratory hopper, and a second gate valve from top to bottom. The second electrostatic isolation ring is provided to eliminate the influence of static electricity in the storage bin on an aluminum residue storage process, thereby avoiding hazards. The third vibratory hopper is provided to assist the flow of aluminum residue through vibration when the aluminum residue is discharged from the storage bin. The second gate valve can effectively prevent a material in the storage bin from leaking out.

According to some examples of the present disclosure, the drying bin and/or the storage bin may be provided with at least one selected from the group consisting of a level meter, a hydrogen meter, and a temperature and humidity meter. The level meter is provided to monitor the amount of aluminum residue in the bin. The hydrogen meter is provided to monitor a hydrogen concentration in the bin. The temperature and humidity meter is provided to monitor a humidity and a temperature in the bin.

According to an example of a second aspect of the present disclosure, a method for safe aluminum residue storage using the device for safe aluminum residue storage described above is provided, including the following steps:
S1. storing aluminum residue in a drying bin, and then turning on a valve of the first air inlet pipe, a valve of the first air outlet pipe, the first exhaust fan, and the first drying blower sequentially for drying the aluminum residue in the drying bin;
S2. turning on a screw conveyor to slowly deliver the aluminum residue to the storage bin with dry air continuously introduced into the drying bin after the drying is completed; and
S3. turning on a valve of the second air outlet pipe, a valve of the second air inlet pipe, the second drying blower, and the second exhaust fan sequentially after feeding is completed; and after an environment in the storage bin meets storage requirement, turning off the second exhaust fan, the second drying blower, the valve of the second air outlet pipe, and the valve of the second air inlet pipe sequentially to allow safe aluminum residue storage.

According to some examples of the present disclosure, in S1, an air volume generated by the first drying blower may be 3 $m^3$/min to 50 $m^3$/min, and drying may be conducted for 10 h to 72 h.

According to some examples of the present disclosure, in S2, the drying is considered completed when the drying bin has a relative humidity of 12.0% to 20%, a temperature equal to an ambient temperature outside the storage bin, and a hydrogen concentration of 0.01% vol to 0.05% vol before introduction of the dry air and after the valve of the first air outlet pipe and the valve of the first air inlet pipe are turned off and the drying bin has reached equilibrium.

According to some examples of the present disclosure, in S2, the screw conveyor may have a conveying capacity of 0.5 t/h to 2 t/h.

According to some examples of the present disclosure, in S3, the storage requirement may include: no hydrogen in the storage bin, the relative humidity in the storage bin being 12.0% to 20%, and the temperature in the storage bin being equal to the ambient temperature outside the storage bin.

Additional aspects and advantages of the present disclosure will be partly provided in the following description, and partly become evident in the following description or understood through the practice of the present disclosure.

BRIEF DESCRIPTION OF DRAWINGS

The above and/or additional aspects and advantages of the present disclosure will become apparent and easy to understand from the description of the examples in conjunction with the following drawings.

FIG. 1 is a schematic diagram illustrating the overall structure of an example of the present disclosure.

Reference numerals: drying bin: 100; first vibratory hopper: 110; first air inlet pipe: 120; first drying blower: 121; first air outlet pipe: 130; deacidifier: 131; dehydrogenator: 132; first exhaust fan: 133; first level meter: 140; first hydrogen meter: 150; first temperature and humidity meter: 160; first antistatic grounding device: 170; first electrostatic isolation ring: 180; second vibratory hopper: 181; first gate valve: 182; screw conveyor: 183; storage bin: 200; butterfly valve: 210; second air inlet pipe: 220; second drying blower: 221; inert gas bottle: 222; second air outlet pipe: 230; dryer: 231; second exhaust fan: 232; second level meter: 240; second hydrogen meter: 250; second temperature and humidity meter: 260; second antistatic grounding device: 270; second electrostatic isolation ring: 280; third vibratory hopper: 281; and second gate valve: 282.

DETAILED DESCRIPTION

The examples of the present disclosure are described below in detail. Examples of the examples are shown in the accompanying drawings. The same or similar numerals represent the same or similar elements or elements having the same or similar functions throughout the specification. The examples described below with reference to the accompanying drawings are exemplary, and are only used to explain the present disclosure but should not be construed as a limitation to the present disclosure.

As shown in FIG. 1, a device for safe aluminum residue storage includes:

drying bin 100, where a feed inlet of the drying bin 100 is located at a top of the drying bin 100 and is provided with a first vibratory hopper 110; a side wall of the drying bin 100 is provided with a first air inlet pipe 120 and a first air outlet pipe 130; the first air inlet pipe 120 is located at a middle-lower part of the drying bin 100; the first air outlet pipe 130 is located at a middle-upper part of the drying bin 100; the first air inlet pipe 120 is connected to a first drying blower 121; the first air outlet pipe 130 is provided sequentially with a deacidifier 131, a dehydrogenator 132, and a first exhaust fan 133 along an airflow direction thereof; the first air inlet pipe 120 and the first air outlet pipe 130 each are provided with a barometer; the drying bin 100 is further provided with a first level meter 140, a first hydrogen meter 150, and a first temperature and humidity meter 160; the drying bin 100 is connected to a first antistatic grounding device 170; and a discharge outlet of the drying bin 100 is connected sequentially to a first electrostatic isolation ring 180, a second vibratory hopper 181, and a first gate valve 182 from top to bottom; and a storage bin 200 located below the drying bin 100, where a feed inlet of the storage bin 200 is connected to the discharge outlet of the drying bin 100 through a screw conveyor 183; a feed inlet of the storage bin 200 is further provided with a butterfly valve 210; a side wall of the storage bin 200 is provided with a second air inlet pipe 220 and a second air outlet pipe 230; the second air inlet pipe 220 is located at a middle-lower part of the storage bin 200; the second air outlet pipe 230 is located at a middle-upper part of the storage bin 200; the second air inlet pipe 220 is connected to a second drying blower 221; an end of the second air inlet pipe 220 is connected to an inert gas bottle 222; the second air outlet pipe 230 is connected sequentially to a dryer 231 and a second exhaust fan 232 along an airflow direction thereof; the second air inlet pipe 220 and the second air outlet pipe 230 each are provided with a barometer; the storage bin 200 is further provided with a second level meter 240, a second hydrogen meter 250, and a second temperature and humidity meter 260; the storage bin 200 is connected to a second antistatic grounding device 270; and a discharge outlet of the storage bin 200 is connected sequentially to a second electrostatic isolation ring 280, a third vibratory hopper 281, and a second gate valve 282 from top to bottom.

A method for safe aluminum residue storage using the device for safe aluminum residue storage described above specifically included the following steps:

S1. the first vibratory hopper 110 was turned on, about 13 t of aluminum residue produced in a recycling process of positive electrode sheet scraps was stored in the drying bin 100, and a valve of the first air inlet pipe 120, a valve of the first air outlet pipe 130, the first exhaust fan 133, and the first drying blower 121 were sequentially turned on, where an air volume generated by the drying blower was 5 m³/min and the aluminum residue was dried in the drying bin 100 for about 28 h;

S2. a drying degree in the drying bin 100 was monitored with the first hydrogen meter 150 and the first temperature and humidity meter 160; and after the drying was conducted for 28 h, the introduction of dry gas was not started, and the valve of the first air outlet pipe 130 and the valve of the first air inlet pipe 120 were turned off, in which case, if the drying bin 100 had a relative humidity of 12.3%, a temperature equal to an ambient temperature outside the storage bin 200 (28° C.), and a hydrogen concentration of 0.02% vol after being stabilized and these values remained unchanged, the drying for the aluminum residue was completed;

S3. based on the completion of the aluminum residue drying in S2, with the drying bin 100 being continuously introduced with dry air, the second vibratory hopper 181, the first gate valve 182, the butterfly valve 210, and the screw conveyor 183 were sequentially turned on, such that the aluminum residue was slowly delivered to the storage bin 200, where a conveying capacity of the screw conveyor 183 was controlled at 0.8 t/h, and an input aluminum residue volume was monitored by the second level meter 240 of the storage bin 200;

S4. after feeding was completed, the butterfly valve 210 was turned off, a valve of the second air outlet pipe 230, a valve of the second air inlet pipe 220, the second drying blower 221, and the second exhaust fan 232 were sequentially turned on, and the second air inlet pipe 220 was connected to an argon gas bottle; and after no hydrogen could be detected by the second hydrogen meter 250, a relative humidity in the storage bin 200 was 12.5% and a temperature was equal to an ambient temperature outside the storage bin 200 (which were determined by the second temperature and humidity meter 260), and the storage bin 200 was full of argon, the second exhaust fan 232, the second drying blower 221, the valve of the second air outlet pipe 230, and the valve of the second air inlet pipe 220 were sequentially turned off, and the second air inlet pipe 220 was disconnected from the argon gas bottle, such that safe aluminum residue storage could be achieved; and S5. when the aluminum residue needed to be discharged from the storage bin 200, the second air inlet pipe 220 was connected to the argon gas bottle, and the second exhaust fan 232, the second drying blower 221, the valve of the second air outlet pipe 230, and the valve of the second air inlet pipe 220 were sequentially turned on, and then the third vibratory hopper 281 and the second gate valve 282 were turned on to discharge.

The present disclosure is described in detail with reference to the accompanying drawings and examples, but the present disclosure is not limited to the above examples. Within the scope of knowledge possessed by those of ordinary skill in the technical field, various changes can also be made without departing from the purpose of the present disclosure.

The invention claimed is:

1. A device for safe aluminum residue storage, comprising:

a drying bin, wherein a side wall of the drying bin is provided with a first air inlet pipe and a first air outlet pipe, the first air inlet pipe is connected to a first drying blower, and the first air outlet pipe is connected sequentially to a deacidifier, a dehydrogenator, and a first exhaust fan along an airflow direction thereof; and a storage bin located below the drying bin, wherein a feed inlet of the storage bin is connected to a discharge outlet of the drying bin through a screw conveyor, a side wall of the storage bin is provided with a second air inlet pipe and a second air outlet pipe, the second air inlet pipe is connected to a second drying blower, an end of the second air inlet pipe is configured to be connected to an inert gas bottle, and the second air outlet pipe is connected sequentially to a dryer and a second exhaust fan along an airflow direction thereof.

2. The device for safe aluminum residue storage according to claim 1, wherein the drying bin and/or the storage bin is/are connected to an antistatic grounding device.

3. A method for safe aluminum residue storage using the device for safe aluminum residue storage according to claim 2, comprising following steps:
- S1. storing aluminum residue in the drying bin, and then turning on a valve of the first air inlet pipe, a valve of the first air outlet pipe, the first exhaust fan, and the first drying blower sequentially for drying the aluminum residue in the drying bin;
- S2. turning on the screw conveyor to slowly deliver the aluminum residue to the storage bin with dry air continuously introduced into the drying bin after the drying is completed; and
- S3. turning on a valve of the second air outlet pipe, a valve of the second air inlet pipe, the second drying blower, and the second exhaust fan sequentially after feeding is completed; and after an environment in the storage bin meets storage requirement, turning off the second exhaust fan, the second drying blower, the valve of the second air outlet pipe, and the valve of the second air inlet pipe sequentially to allow safe aluminum residue storage.

4. The method according to claim 3, wherein in S1, an air volume generated by the first drying blower is 3 $m^3$/min to 50 $m^3$/min, and drying is conducted for 10 h to 72 h; in S2, the drying is considered completed when the drying bin has a relative humidity of 12.0% to 20%, a temperature equal to an ambient temperature outside the storage bin, and a hydrogen concentration of 0.01% vol to 0.05% vol before introduction of the dry air and after the valve of the first air outlet pipe and the valve of the first air inlet pipe are turned off and the drying bin has reached equilibrium; in S2, the screw conveyor has a conveying capacity of 0.5 t/h to 2 t/h; and in S3, the storage requirement comprises: no hydrogen in the storage bin, the relative humidity in the storage bin being 12.0% to 20%, and the temperature in the storage bin being equal to the ambient temperature outside the storage bin.

5. The device for safe aluminum residue storage according to claim 1, wherein a feed inlet of the drying bin is located at a top of the drying bin, and the feed inlet of the drying bin is provided with a first vibratory hopper.

6. A method for safe aluminum residue storage using the device for safe aluminum residue storage according to claim 5, comprising following steps:
- S1. storing aluminum residue in the drying bin, and then turning on a valve of the first air inlet pipe, a valve of the first air outlet pipe, the first exhaust fan, and the first drying blower sequentially for drying the aluminum residue in the drying bin;
- S2. turning on the screw conveyor to slowly deliver the aluminum residue to the storage bin with dry air continuously introduced into the drying bin after the drying is completed; and
- S3. turning on a valve of the second air outlet pipe, a valve of the second air inlet pipe, the second drying blower, and the second exhaust fan sequentially after feeding is completed; and after an environment in the storage bin meets storage requirement, turning off the second exhaust fan, the second drying blower, the valve of the second air outlet pipe, and the valve of the second air inlet pipe sequentially to allow safe aluminum residue storage.

7. The method according to claim 6, wherein in S1, an air volume generated by the first drying blower is 3 $m^3$/min to 50 $m^3$/min, and drying is conducted for 10 h to 72 h; in S2, the drying is considered completed when the drying bin has a relative humidity of 12.0% to 20%, a temperature equal to an ambient temperature outside the storage bin, and a hydrogen concentration of 0.01% vol to 0.05% vol before introduction of the dry air and after the valve of the first air outlet pipe and the valve of the first air inlet pipe are turned off and the drying bin has reached equilibrium; in S2, the screw conveyor has a conveying capacity of 0.5 t/h to 2 t/h; and in S3, the storage requirement comprises: no hydrogen in the storage bin, the relative humidity in the storage bin being 12.0% to 20%, and the temperature in the storage bin being equal to the ambient temperature outside the storage bin.

8. The device for safe aluminum residue storage according to claim 1, wherein a second vibratory hopper is further provided between the discharge outlet of the drying bin and a feed inlet of the screw conveyor.

9. The device for safe aluminum residue storage according to claim 8, wherein a first electrostatic isolation ring is provided between a feed inlet of the second vibratory hopper and the discharge outlet of the drying bin, and the first electrostatic isolation ring is a rubber isolation ring containing an antistatic agent.

10. A method for safe aluminum residue storage using the device for safe aluminum residue storage according to claim 9, comprising following steps:
- S1. storing aluminum residue in the drying bin, and then turning on a valve of the first air inlet pipe, a valve of the first air outlet pipe, the first exhaust fan, and the first drying blower sequentially for drying the aluminum residue in the drying bin;
- S2. turning on the screw conveyor to slowly deliver the aluminum residue to the storage bin with dry air continuously introduced into the drying bin after the drying is completed; and
- S3. turning on a valve of the second air outlet pipe, a valve of the second air inlet pipe, the second drying blower, and the second exhaust fan sequentially after feeding is completed; and after an environment in the storage bin meets storage requirement, turning off the second exhaust fan, the second drying blower, the valve of the second air outlet pipe, and the valve of the second air inlet pipe sequentially to allow safe aluminum residue storage.

11. The device for safe aluminum residue storage according to claim 9, wherein a first gate valve is further provided between a discharge outlet of the second vibratory hopper and the feed inlet of the screw conveyor.

12. A method for safe aluminum residue storage using the device for safe aluminum residue storage according to claim 11, comprising following steps:
- S1. storing aluminum residue in the drying bin, and then turning on a valve of the first air inlet pipe, a valve of the first air outlet pipe, the first exhaust fan, and the first drying blower sequentially for drying the aluminum residue in the drying bin;
- S2. turning on the screw conveyor to slowly deliver the aluminum residue to the storage bin with dry air continuously introduced into the drying bin after the drying is completed; and
- S3. turning on a valve of the second air outlet pipe, a valve of the second air inlet pipe, the second drying blower, and the second exhaust fan sequentially after feeding is completed; and after an environment in the storage bin meets storage requirement, turning off the second exhaust fan, the second drying blower, the valve of the second air outlet pipe, and the valve of the second air inlet pipe sequentially to allow safe aluminum residue storage.

13. A method for safe aluminum residue storage using the device for safe aluminum residue storage according to claim 8, comprising following steps:
   S1. storing aluminum residue in the drying bin, and then turning on a valve of the first air inlet pipe, a valve of the first air outlet pipe, the first exhaust fan, and the first drying blower sequentially for drying the aluminum residue in the drying bin;
   S2. turning on the screw conveyor to slowly deliver the aluminum residue to the storage bin with dry air continuously introduced into the drying bin after the drying is completed; and
   S3. turning on a valve of the second air outlet pipe, a valve of the second air inlet pipe, the second drying blower, and the second exhaust fan sequentially after feeding is completed; and after an environment in the storage bin meets storage requirement, turning off the second exhaust fan, the second drying blower, the valve of the second air outlet pipe, and the valve of the second air inlet pipe sequentially to allow safe aluminum residue storage.

14. The method according to claim 13, wherein in S1, an air volume generated by the first drying blower is 3 m³/min to 50 m³/min, and drying is conducted for 10 h to 72 h; in S2, the drying is considered completed when the drying bin has a relative humidity of 12.0% to 20%, a temperature equal to an ambient temperature outside the storage bin, and a hydrogen concentration of 0.01% vol to 0.05% vol before introduction of the dry air and after the valve of the first air outlet pipe and the valve of the first air inlet pipe are turned off and the drying bin has reached equilibrium; in S2, the screw conveyor has a conveying capacity of 0.5 t/h to 2 t/h; and in S3, the storage requirement comprises: no hydrogen in the storage bin, the relative humidity in the storage bin being 12.0% to 20%, and the temperature in the storage bin being equal to the ambient temperature outside the storage bin.

15. The device for safe aluminum residue storage according to claim 1, wherein a discharge outlet of the storage bin is connected sequentially to a second electrostatic isolation ring, a third vibratory hopper, and a second gate valve from top to bottom.

16. A method for safe aluminum residue storage using the device for safe aluminum residue storage according to claim 15, comprising following steps:
   S1. storing aluminum residue in the drying bin, and then turning on a valve of the first air inlet pipe, a valve of the first air outlet pipe, the first exhaust fan, and the first drying blower sequentially for drying the aluminum residue in the drying bin;
   S2. turning on the screw conveyor to slowly deliver the aluminum residue to the storage bin with dry air continuously introduced into the drying bin after the drying is completed; and
   S3. turning on a valve of the second air outlet pipe, a valve of the second air inlet pipe, the second drying blower, and the second exhaust fan sequentially after feeding is completed; and after an environment in the storage bin meets storage requirement, turning off the second exhaust fan, the second drying blower, the valve of the second air outlet pipe, and the valve of the second air inlet pipe sequentially to allow safe aluminum residue storage.

17. The device for safe aluminum residue storage according to claim 1, wherein the drying bin and/or the storage bin is/are provided with at least one selected from a group consisting of a level meter, a hydrogen meter, and a temperature and humidity meter.

18. A method for safe aluminum residue storage using the device for safe aluminum residue storage according to claim 17, comprising following steps:
   S1. storing aluminum residue in the drying bin, and then turning on a valve of the first air inlet pipe, a valve of the first air outlet pipe, the first exhaust fan, and the first drying blower sequentially for drying the aluminum residue in the drying bin;
   S2. turning on the screw conveyor to slowly deliver the aluminum residue to the storage bin with dry air continuously introduced into the drying bin after the drying is completed; and
   S3. turning on a valve of the second air outlet pipe, a valve of the second air inlet pipe, the second drying blower, and the second exhaust fan sequentially after feeding is completed; and after an environment in the storage bin meets storage requirement, turning off the second exhaust fan, the second drying blower, the valve of the second air outlet pipe, and the valve of the second air inlet pipe sequentially to allow safe aluminum residue storage.

19. A method for safe aluminum residue storage using the device for safe aluminum residue storage according to claim 1, comprising following steps:
   S1. storing aluminum residue in the drying bin, and then turning on a valve of the first air inlet pipe, a valve of the first air outlet pipe, the first exhaust fan, and the first drying blower sequentially for drying the aluminum residue in the drying bin;
   S2. turning on the screw conveyor to slowly deliver the aluminum residue to the storage bin with dry air continuously introduced into the drying bin after the drying is completed; and
   S3. turning on a valve of the second air outlet pipe, a valve of the second air inlet pipe, the second drying blower, and the second exhaust fan sequentially after feeding is completed; and after an environment in the storage bin meets storage requirement, turning off the second exhaust fan, the second drying blower, the valve of the second air outlet pipe, and the valve of the second air inlet pipe sequentially to allow safe aluminum residue storage.

20. The method according to claim 19, wherein in S1, an air volume generated by the first drying blower is 3 m³/min to 50 m³/min, and drying is conducted for 10 h to 72 h; in S2, the drying is considered completed when the drying bin has a relative humidity of 12.0% to 20%, a temperature equal to an ambient temperature outside the storage bin, and a hydrogen concentration of 0.01% vol to 0.05% vol before introduction of the dry air and after the valve of the first air outlet pipe and the valve of the first air inlet pipe are turned off and the drying bin has reached equilibrium; in S2, the screw conveyor has a conveying capacity of 0.5 t/h to 2 t/h; and in S3, the storage requirement comprises: no hydrogen in the storage bin, the relative humidity in the storage bin being 12.0% to 20%, and the temperature in the storage bin being equal to the ambient temperature outside the storage bin.

* * * * *